United States Patent [19]

Edwards

[11] Patent Number: 5,365,267
[45] Date of Patent: Nov. 15, 1994

[54] WHITE BALANCE TARGET

[75] Inventor: Nelson Edwards, Clearwater, Fla.

[73] Assignee: Linvatec Corporation, Largo, Fla.

[21] Appl. No.: 901,059

[22] Filed: Jun. 19, 1992

[51] Int. Cl.$^5$ .......................... H04N 7/18; H04N 9/73
[52] U.S. Cl. ....................................... 348/65; 348/68;
   348/223; 128/6; 359/707; 359/896
[58] Field of Search ................... 358/29 C, 29, 27, 28,
   358/55, 80, 98; 128/6, 4, 8, 7, 5; 356/241;
   359/896, 892, 885, 884, 707, 720, 798, 894;
   348/223, 224, 225, 227, 228, 229, 65, 66, 67, 68,
   69, 70, 71, 72, 832; H04N 9/73, 7/18

[56] References Cited

U.S. PATENT DOCUMENTS

| | | |
|---|---|---|
| 4,489,345 | 12/1984 | Hani et al. .......................... 358/29 C |
| 4,527,189 | 7/1985 | Ooi et al. .......................... 358/29 C |
| 4,716,457 | 12/1987 | Matsuo . |
| 4,739,394 | 4/1988 | Oda et al. . |
| 4,831,437 | 5/1989 | Nishioka et al. . |
| 5,045,928 | 9/1991 | Takaiwa et al. . |
| 5,155,635 | 10/1992 | Kakiuchi .......................... 359/896 |

FOREIGN PATENT DOCUMENTS 0133192 10/1980 Japan .......................... 358/29 C

*Primary Examiner*—James J. Groody
*Assistant Examiner*—Michael H. Lee
*Attorney, Agent, or Firm*—Gene Warzecha

[57] ABSTRACT

A target for use in white balancing video cameras and, in particular, video cameras suitable for endoscopic use. The target is molded from an elastomeric material having the ability to diffuse a substantial portion of light incident upon the target from a video camera. A user may use the target to white balance a video camera by placing the camera directly on the target and adjusting the light intensity of the camera's light source. In the case of an endoscopic camera, the distal tip of the scope (extending from the camera) is placed directly on the target. The user need not be concerned about aiming the camera at a selected white target and holding it a certain distance from the target.

17 Claims, 2 Drawing Sheets

WHITE BALANCE TARGET

BACKGROUND OF THE INVENTION

1. Field of the Invention

This invention relates to methods and devices for balancing colors in optical camera systems. More particularly, the invention relates to a device and method for white-balancing video cameras used in surgical procedures. Still more particularly, the invention relates to white balancing video cameras used in endoscopic surgical procedures.

2. Description of the Prior Art

While the invention generally relates to white-balancing any video camera, it has particular utility for use with video cameras adapted for surgical endoscopic procedures utilizing cameras, internal illumination sources and external monitors. In such procedures it is important that camera systems portray accurate colors as much as possible since colors of internal organs are often indicative of their physiological condition and since surgeons must totally rely on the image presented to them on a monitor in order to make a proper diagnosis.

As used herein, the term "endoscopic" is used to mean all least invasive medical procedures such as arthroscopy, laparoscopy, etc. in which a camera is used to visualize internal parts of a body through small body openings (either artificially created or naturally occurring). The terms "endoscope" and "scope" are used to refer to the cameras used in such procedures, such cameras having elongated optics-containing tubes between the distal (objective) tip and the proximal, image-forming components. The invention described herein is suitable for use with a variety of scope configurations and also with scopes which may have the image forming components at the distal tip. Such cameras are generally used with fiber optics situated in the elongated tube to direct light from an external light source to the internal work site being viewed by the camera. It is this light, reflected from internal organs, which illuminates the scene viewed by the surgeon.

In order for the video equipment to perform optimally, it must be white balanced. White balancing a camera predefines what the color white will be for a particular camera. That is, the camera's output is adjusted to "white" when a selected white target is viewed. If white balancing is improperly performed, the video picture presented on the monitor will not truly represent the image viewed by the camera.

Operating room personnel and surgeons typically white balance a camera using highly subjective (and, therefore, variable) techniques such as aiming the camera at a target such as 4"×4" piece of gauze, styrofoam cup, paper or other white surface. These techniques all involve focusing the scope onto the white surface by holding the scope an appropriate distance from the white surface to enable it to receive light reflected from the surface while simultaneously adjusting the light intensity of the light source. The camera white balancing button is then depressed when the camera operator feels the picture on the monitor is not blooming or oversaturated with light and represents a true white color or good brightness. The manner in which the camera electronics are adjusted forms no part of this invention.

The current methods of white balancing a camera are very subjective and leave room for error. Disadvantages of these techniques involve the inaccuracies created by using reflective surfaces and the difficulty of being able to steadily hold a scope at an optimum distance from a target. Since the camera light source is effectively at the scope tip, reliance on the reflective properties of a surface for white balancing results in the center of the picture being much brighter than the edges, thus producing an uneven brightness across the image on the monitor. Also, inconsistencies in the surface at which the scope is aimed can cause shadowing and dark spots resulting in poor picture quality. Furthermore, textural features on the surface create color and brightness variations in the image used to form the basis of the white balance, thus resulting in an inaccurate adjustment. Additionally, it is difficult for a user to hold the scope the ideal distance away from the white surface while trying to adjust the light source intensity level and depress the white balance button at the same time.

SUMMARY OF THE INVENTION

It is an object of this invention to produce a white balance target and method of using same to overcome the disadvantages of the prior art.

It is another object of this invention to produce a white balance target and method which is suitable for use with many different types of scopes and which minimize the subjectivity associated with prior art white balancing methods and devices.

It is yet another object of this invention to produce a white balance target and method which facilitates the production of an image having a uniform level of brightness on a monitor, which image is then used as a baseline to define the white level for the camera.

The white balance target disclosed herein eliminates most of the subjectivity involved in white balancing a camera and consistently creates a white color standard for vivid and accurate color video pictures. The target is a unitary molded silicone/titanium dioxide composition which utilizes a different principle of operation than prior art devices in that it relies on diffusion characteristics of a target rather than reflective surface properties of a target. White balancing a camera with the subject invention is as easy as pressing the scope tip into the target, adjusting the light source intensity level and activating the camera's white balance control button.

DESCRIPTION OF THE PREFERRED EMBODIMENT

Figure 1:
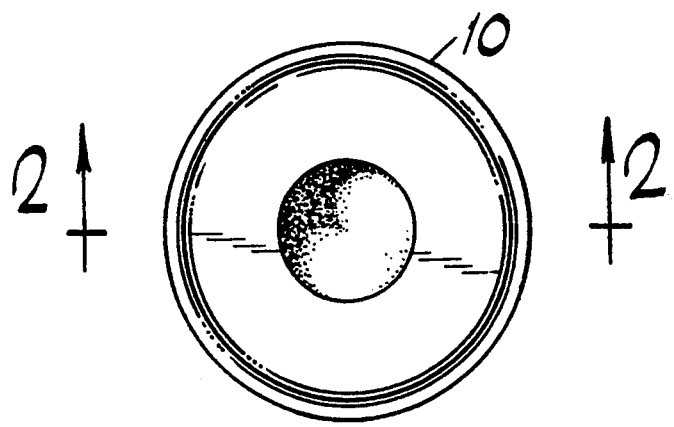
FIG. 1 is a plan view of a white balance target constructed in accordance with the principles of this invention.
Figure 2:
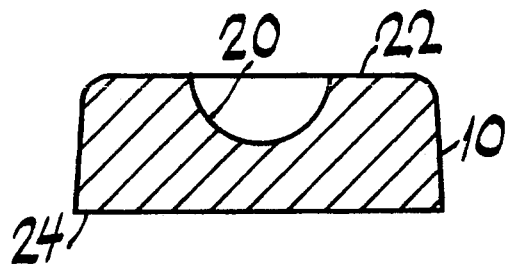
FIG. 2 is a cross-sectional elevational view of FIG. 1 taken along the line 2—2.

Referring now to FIGS. 1 and 2, a preferred embodiment of a white balance target 10 is shown. Target 10 is preferably a molded, homogeneous, elastomeric material having certain optical properties which greatly contribute to the use of the target in white balancing a video camera. It is believed that the optical properties required of target 10 are that it must (1) diffuse substantially all light incident upon it from a camera source, (2)

not enable an unacceptable level of reflected light to be received by the camera from reflective surfaces outside the target body and (3) have a uniform distribution of color in its body so diffused light received by the camera will have a uniform intensity and color over the camera's field of view. In a preferred embodiment, target 10 is a molded translucent composition formed of a base material such as silicone and a color additive such as titanium dioxide. The silicone is clear and sterilizable while the titanium dioxide acts as an excellent white, optical scattering material. Although other materials could be used, silicone is used in the preferred embodiment because it can be sterilized by autoclaving and may, therefore, be used in the sterile field of an operating room.

The thickness and diameter of target 10 depend on the diffusion or optical characteristics of its material composition. For example, if target 10 is made of materials having a lesser degree of whiteness than titanium dioxide, the thickness and diameter of the target (for a given incident light intensity) must be greater than for materials using titanium dioxide. Consequently, a variety of targets 10 could be produced, all having similar operating characteristics but different dimensions. A hemispherical depression 20 is provided at the center of the top surface 22 of target 10 in order to accommodate various scope sizes and tip angles (best seen in FIG. 3). In the preferred embodiment, depression 20 is formed by a glass beaded mold part in order to minimize reflectivity from the surface of the depression.

A variety of different targets 10 were made and their white balancing performance was analyzed on an oscilloscope and vectorscope to determine the quality of the white video signal. In each instance a target was molded with differing weight percentages of liquid silicone (Mobay Baysilone LSR 2030 Components A and B) and white color paste (Mobay Baysilone LSR Color Paste-White, S500) as the source of titanium dioxide. The Baysilone paste is a mixture of vinyldimethyl-terminated polydimethylsiloxane with fumed silica and titanium dioxide and was obtained from Miles, Inc., Inorganic Chemicals Division, Mobay Road, Pittsburgh, Pa. 15205. The Baysilone liquid Component A is a mixture of vinyl terminated polydimethylsiloxanes containing fumed silica and Component B is a mixture of vinyl terminated polydimethylsiloxane with fumed silica, methyl hydrogen polysiloxane and both components were also obtained from Miles, Inc. Compositions were made having $\frac{1}{2}$%, 1%, 2%, 4%, and 50% (by weight) of the color paste. All targets were cast to the geometry shown in FIGS. 1 and 2 and several different cameras and scopes were used in the white balancing procedure ranging from 2 mm diameter small joint scopes to a 10 mm diameter laparoscope. The 2% color paste composition produced a target having the optimum characteristics for white balancing. It produced the best white video signal over the range of scopes tested without using excessive amounts of titanium dioxide. It was found that using too little paste (i.e. too little titanium dioxide) could produce a composition that was too red while using too much could produce a composition that was too blue.

The color of target 10 is used to define the color white for the camera. That is, as will be understood below, a user will rely on the color that is produced on a monitor when a scope is pressed against the target and this color is defined as white. While some users may have different opinions about what "white" should look like (i.e. how white is white?), it has been found that the aforementioned 2% composition results in a "white" that is widely accepted by many users.

The dimensions of the preferred embodiment were determined by minimizing the amount of material needed to form target 10 and by optimizing the surface geometry to be used by differently sized and shaped scope tips. The minimum acceptable target thickness was determined by molding the aforementioned 2% target in the form of a wedge (not shown). The bottom of the wedge was placed on a flat black surface and a scope was allowed to pass along the top surface. A significant drop (chosen as 10%) in the oscilloscopic video signal indicated the black surface underneath the target wedge was being detected and the thickness of the wedge at this point defined the minimum target thickness established for the particular scope used. That is, the light "reflected" from the surface was being received by the camera and lowered the overall intensity of the image on the monitor. The worst case scenario was chosen to be one in which a large scope and, therefore, high light intensity was used, for example, 10 mm diameter laparoscope. In this situation the minimum target thickness that was attainable before a significant drop in the video signal was detected was determined to be 0.3 inches. The dimensions of the preferred embodiment were chosen to be those which would enable proper white balancing with the largest scopes most likely to be encountered by a user. It will be understood that all smaller scopes (with less light intensity) would operate equally well with a target suitable for the large scopes.

Figure 3:
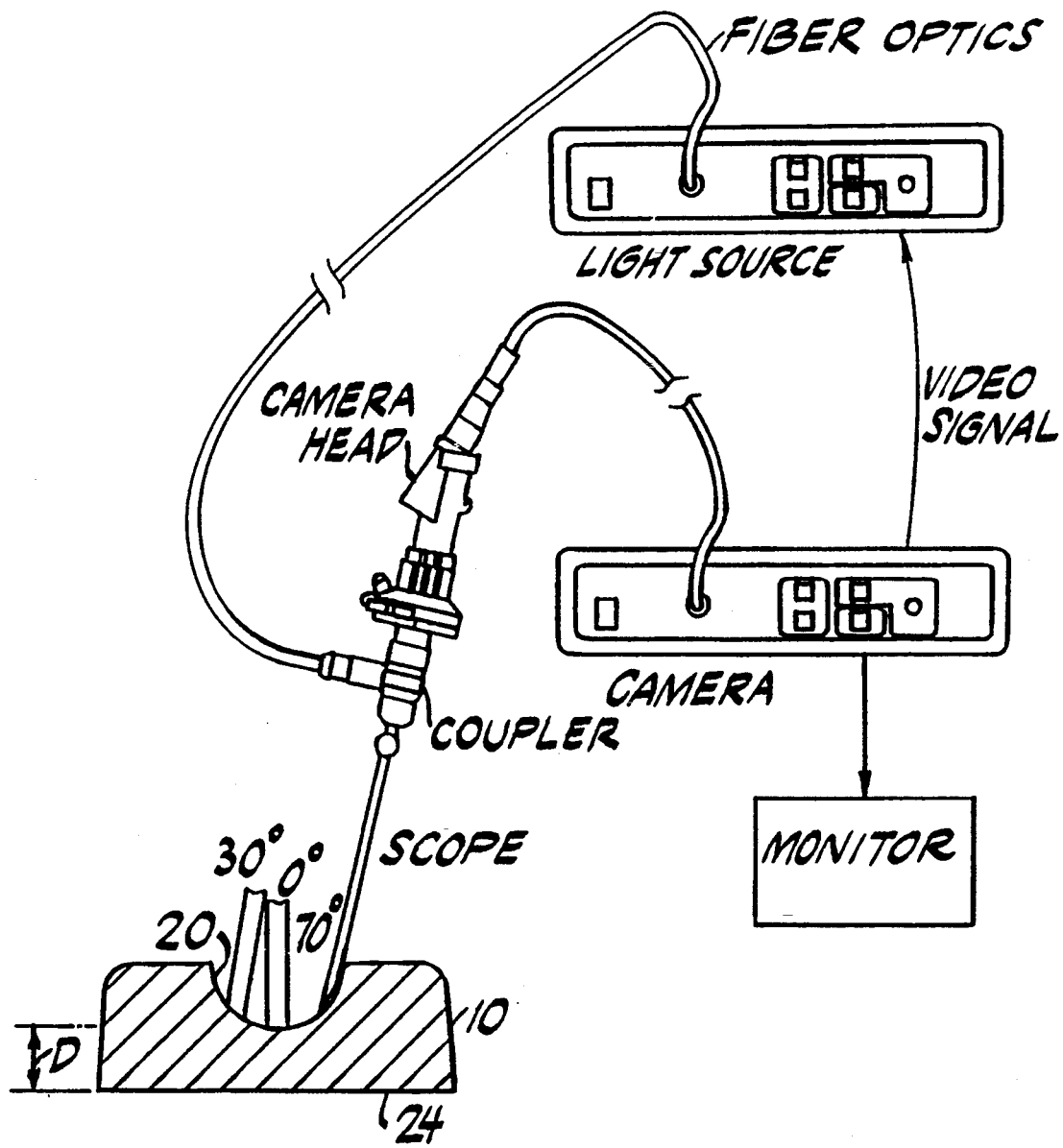
FIG. 3 is a diagrammatic representation of a variety of scope tips positioned adjacent the target.

Hemispherical depression 20 has a radius of curvature of approximately 0.3 inches and is, as best seen in FIG. 3, well suited to receive the distal tip of scopes having a variety of angles. As shown, scopes having distal tips at 0°, 30° and 70° are all able to be placed into substantial contact with the surface of target 10 merely by moving the scope tip to a different point on the hemispherical surface. The elastomeric nature of target 10 enables the scope tip to embed itself slightly in the surface in order to ensure a good optical seal such that all light emanating from the camera tip passes into the body of target 10. The distance D between the bottom of hemispherical depression 20 and the target's bottom surface 24 is 0.3 inches to accommodate large scopes, as mentioned above. This thickness in dimension is maintained around the periphery of hemispherical depression 20 so that the camera may be placed at any point thereon. Surface 24 is made flat merely to facilitate holding, placing or adhering target 10 in any convenient location. The color or texture of the substrate surface onto which surface 24 is placed will not affect operation of target 10 if dimension D is thick enough to prevent light reaching the substrate and being reflected back to the camera. As stated, while D may be smaller for certain scope sizes and light intensities, a D value equal to 0.3 inches appears suitable for almost all applications likely to be encountered by users.

FIG. 3 shows a conventional endoscopic camera system as it may be used with the target. While all components other than the target are conventional, a brief explanation of the system may be helpful. The system comprises a camera head connected by a coupler to the proximal end of an elongated scope. The scope contains fiber optics, for communicating light from the light source and radiating it from the distal scope tip, and an optical means such as a rod lens, for example, to communicate the image viewed by the scope tip to the camera head. The camera head converts the image to a video signal and transmits the video in electronic form to the camera. The camera supplies video to the monitor and a video signal connection between the camera and the light source provides the necessary feedback by which the light source can automatically adjust light intensity. The light source also contains a conventional white balance adjustment circuit for adjusting the white balance upon the user's activation of, for example, a control button.

In operation, a user desiring to white balance a camera will place the distal tip of the scope against the surface of hemispherical depression 20. Light from the camera's light source will pass from the fiber optics at the distal tip and into the body of target 10 where it will be diffused and scattered. This scattered light will be re-radiated from interior of the body of the target back toward the scope. The light intensity is adjusted by the user to produce an image having a uniform brightness on the monitor. Since the target 10 is produced with a predetermined composition of materials having a given degree of "white", the user need do nothing more than press the scope tip into depression 20, tilt the scope tip relative to the target and adjust the light intensity to get a uniform picture on the monitor. Pressing and tilting the scope tip ensures that substantially all light emanating from the camera tip passes into the body of the target and that little or no light is reflected from the depression's surface or from surfaces outside of body 10. Adjustment of the light intensity ensures that the camera's internal signals are in a normal operating range. Since the image produced on the monitor by conventional scopes has a circular border, the user can arrive at a uniformly illuminated image by pressing and tilting the scope tip and adjusting light intensity until the entire circle on the monitor has a substantially uniform intensity. This may be done very quickly since there is very little subjectivity involved in this method. When an acceptable image is produced, the white balance adjustment of the camera is activated (usually by pressing a button) and the process is complete. The camera may then be used as desired with the assurance that all colors produced on the monitor will be accurate relative to the color "white" defined by the target.

It will be understood that similar principles of operation may be achieved by non-solid targets where the scope tip could be surrounded by a diffusing liquid or gaseous medium having similar optical diffusing characteristics.

It will be understood by those skilled in the art that numerous modifications and improvements may be made to the preferred embodiment of the invention described herein without departing from the spirit and scope thereof.

What is claimed is:

1. A target for use in white balancing an endoscopic camera having a distal scope tip comprising a light source for radiating light from said distal scope tip and an optical means for viewing the field illuminated by said light source, the target comprising:
   a light receiving surface for receiving the distal scope tip contiguously adjacent thereto and for receiving light from the light source;
   a light diffusing body operatively associated with said surface and having a predetermined depth substantially greater than the thickness of said light receiving surface for receiving light from said surface, diffusing at least a portion of said received light and re-radiating a predetermined amount of said received light from within said body back through said surface such that the camera views a field of substantially uniform intensity.

2. A target according to claim 1 wherein said light receiving surface and said light diffusing body are portions of a unitary member.

3. A target according to claim 1 wherein at least said light receiving surface is elastomeric.

4. A target according to claim 2 wherein said unitary member is elastomeric.

5. A target for white balancing an endoscopic video camera by being placed into contiguous contact with the camera comprising:
   a unitary molded member formed of a composition of approximately 98% of a mixture of vinyl terminated polydimethylsiloxanes containing fumed silica and vinyl terminated polydimethylsiloxane with fumed silica, methyl hydrogen polysiloxane, by weight, and approximately 2% of a mixture of vinyldimethyl-terminated polydimethylsiloxane with fumed silica and titanium dioxide, by weight.

6. A target for use in white balancing an endoscopic camera having a distal scope tip comprising a light source for radiating light from said distal scope tip and an optical means for viewing the field illuminated by said light source, the target;
   a unitary member formed of an elastomeric material, said member comprising:
   a base surface;
   a top surface parallel to said base surface, said top surface for receiving the distal tip contiguously adjacent thereto and for receiving light from the light source;
   a cylindrical body portion extending upwardly from said base surface to said top surface for receiving light from said surface, diffusing at least a portion of said received light and re-radiating a predetermined amount of said received light from within said body back through said surface.

7. A target according to claim 6 further comprising a hemispherical depression centrally formed in said top surface for receiving the distal scope tip.

8. A target according to claim 7 wherein the diameter of said hemispherical depression is aligned with said top surface.

9. A target according to claim 7 wherein said elastomeric material is formed of a composition of approximately 98% of a mixture of vinyl terminated polydimethylsiloxanes containing funded silica or vinyl terminated polydimethylsiloxane with fumed silica, methyl hydrogen polysiloxane and approximately 2% of a mixture of vinyldimethyl-terminated polydimethylsiloxane with fumed silica and titanium dioxide, by weight, and wherein said cylindrical body portion has a circular cross-section, the diameter of which is greater than about 1.5 inches and wherein the distance between the top and base surfaces is greater than about 0.6 inches and wherein the radius of said hemispherical depression is greater than about 0.3 inches.

10. A method of white balancing an endoscopic camera having a light source at its distal tip comprising:
   providing a translucent, light diffusing target having a light receiving surface;
   placing the distal, image receiving tip of said camera in contact with said light receiving surface of said target;

illuminating said light diffusing target through said light receiving surface;

receiving light back through said light receiving surface;

adjusting the light intensity received by said camera to achieve a desirable level of whiteness.

11. A method according to claim 10 wherein said target is an elastomeric material.

12. A method according to claim 10 wherein said camera is an endoscopic camera.

13. A method according to claim 10 further comprising the step of providing said target with a hemispherical depression for receiving said distal tip.

14. A method of white balancing a camera comprising the steps of:

providing a target with a light receiving surface, said target having a predetermined degree of whiteness and the capability of producing a predetermined degree of diffusion of light incident upon said light receiving surface;

placing a portion of said camera into contiguity with said light receiving surface;

illuminating said light receiving surface;

receiving light back through said light receiving surface;

adjusting the light intensity of said camera to a desirable level.

15. A method according to claim 14 wherein said camera is an endoscopic camera.

16. A method according to claim 14 wherein said target is elastomeric.

17. A method according to claim 14 further comprising the steps of:

illuminating the body of said target with light emanating from an area adjacent said camera, said light directed away from said camera;

diffusing said light and re-radiating it from within the body of said target back to said camera;

adjusting the intensity of said light until the image produced by said camera on a monitor is substantially of uniform intensity.

* * * * *

UNITED STATES PATENT AND TRADEMARK OFFICE
CERTIFICATE OF CORRECTION

PATENT NO. : 5,365,267
DATED : NOVEMBER 15, 1994
INVENTOR(S) : NELSON EDWARDS

It is certified that error appears in the above-identified patent and that said Letters Patent is hereby corrected as shown below:

Column 6, line 51, "funded" should read -- fumed --

Signed and Sealed this

Thirty-first Day of January, 1995

Attest:

BRUCE LEHMAN

Attesting Officer

Commissioner of Patents and Trademarks